United States Patent
Alt et al.

(10) Patent No.: US 12,273,277 B2
(45) Date of Patent: *Apr. 8, 2025

(54) INTELLIGENT ALLOCATION OF RESOURCES IN A COMPUTING SYSTEM

(71) Applicant: Advanced Micro Devices, Inc., Santa Clara, CA (US)

(72) Inventors: Max Alt, San Francisco, MI (US); Paulo Roberto Pereira de Souza filho, Maringa (BR)

(73) Assignee: Advanced Micro Devices, Inc., Santa Clara, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 18/144,941

(22) Filed: May 9, 2023

(65) Prior Publication Data
US 2023/0275849 A1 Aug. 31, 2023

Related U.S. Application Data

(63) Continuation of application No. 17/388,503, filed on Jul. 29, 2021, now Pat. No. 11,677,681.

(60) Provisional application No. 63/058,101, filed on Jul. 29, 2020.

(51) Int. Cl.
| | | |
|---|---|---|
| G06F 15/173 | (2006.01) | |
| H04L 43/0852 | (2022.01) | |
| H04L 43/0882 | (2022.01) | |
| H04L 47/762 | (2022.01) | |
| H04L 47/78 | (2022.01) | |
| H04L 47/80 | (2022.01) | |

(52) U.S. Cl.
CPC ........ *H04L 47/805* (2013.01); *H04L 43/0858* (2013.01); *H04L 43/0882* (2013.01); *H04L 47/762* (2013.01); *H04L 47/781* (2013.01)

(58) Field of Classification Search
CPC ... H04L 47/762; H04L 47/781; H04L 47/805; H04L 43/0882; H04L 43/0858
See application file for complete search history.

(56) References Cited

U.S. PATENT DOCUMENTS

| | | | |
|---|---|---|---|
| 11,159,403 B1 | 10/2021 | Kaddoura | |
| 11,677,681 B1 * | 6/2023 | Alt | H04L 41/5019 |
| | | | 709/226 |
| 2013/0346987 A1 | 12/2013 | Raney | |
| 2015/0095666 A1 | 4/2015 | Ananthakrishnan | |
| 2020/0073718 A1 | 3/2020 | Singh | |

* cited by examiner

*Primary Examiner* — Yves Dalencourt
(74) *Attorney, Agent, or Firm* — Fishman Stewart PLLC (57) ABSTRACT

Systems and methods for allocating computing resources within a distributed computing system are disclosed. Computing resources such as CPUs, GPUs, network cards, and memory are allocated to jobs submitted to the system by a scheduler. System configuration and interconnectivity information is gathered by a mapper and used to create a graph. Resource allocation is optimized based on one or more quality of service (QoS) levels determined for the job. Job performance characterization, affinity models, computer resource power consumption, and policies may also be used to optimize the allocation of computing resources.

21 Claims, 8 Drawing Sheets

INTELLIGENT ALLOCATION OF RESOURCES IN A COMPUTING SYSTEM

CROSS-REFERENCE TO RELATED APPLICATIONS

This application is a continuation of U.S. patent application Ser. No. 17/388,503, filed Jul. 29, 2021, now U.S. Pat. No. 11,677,681, which claims the benefit of, and priority to, U.S. Provisional Application Ser. No. 63/058,101, filed Jul. 29, 2020, the contents of each of which is hereby incorporated herein by reference in its entirety and for all purposes.

TECHNICAL FIELD

The present disclosure generally relates to the field of computing and, more particularly, to systems and methods for scheduling resources in parallel computing systems.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Data intensive computing tasks such as machine learning (ML), artificial intelligence (AI), data mining, and scientific simulation often require large amounts of computing resources, including storage, memory, and computing power. As the time required for a single system or processor to complete many of these tasks would be too great, they are typically divided into many smaller tasks that are distributed to large numbers of processors such as central processing units (CPUs) or graphics processing units (GPUs) that work in parallel to complete them more quickly. Specialized computing systems having large numbers of processors that work in parallel have been designed to aid in completing these tasks more quickly and efficiently.

Operating these computing systems efficiently can be difficult, as they can receive a large number of jobs (e.g., computing tasks) that queue up waiting for resources. This is particularly true for systems that incorporate many different processor types and system configurations. As different jobs are submitted for processing by customers, hardware resources such as CPUs, GPUs, memory, and storage must be removed from the pool of available resources and allocated to the job. Past solutions have been lacking in their ability to automatically and intelligently select the optimal resources to be allocated to multiple job based on complex criteria. Instead, many solutions are currently limited to simple resource selection methods. For example, some solutions represent processing nodes in a system as a simple one-dimensional array, with jobs being allocated resources on a best-fit basis. Best fit algorithms generally allocate resources to each job by selecting the smallest sufficient set of resources among those available. While this may work well for simple system configurations, it can result in sub-optimal resource allocation in systems with complex variations in system resources. For at least these reasons, there is a desire for an improved system and method for recommending computing resources in a computing system.

SUMMARY

An improved system and method for intelligent scheduling of computing resources such as CPUs, GPUs, memory, and network cards or interfaces in a computer system is contemplated. In one embodiment, allocation for jobs submitted to the system is optimized based not only on the topology of computing resources, but also based one or more quality of service (QoS) levels determined for the job. In addition, job performance characterization and even computer resource power consumption may be used to optimize the allocation of computing resources.

In one embodiment, the method comprises gathering configuration information for the computing system, which include computing resources such as CPUs, GPUs, FPGAs and other accelerators, memory, network cards and interfaces, and storage. Some of the resources may be bare metal, and others may be virtualized/containerized. The configuration information may for example, include the type and number of computing resources and also interconnectivity attributes such as bandwidth and latency for the processors (e.g., CPUs and GPUs), network cards and interfaces, and memory in the computing system. The configuration information may be stored in a graph (e.g., mesh), with interconnectivity attributes includes (e.g. as costs between graph/mesh nodes).

Jobs to be executed in the computing system are received, and requirements for those jobs are determined (e.g., the number of processors or amount of memory required). The jobs may include applications run in batch mode (i.e., without user interaction) or interactive mode, and some may be within containers or virtual machines. One or more quality of service (QoS) levels or attributes may also be determined and applied to the jobs. For example, one QoS level may be a minimum bandwidth required between GPUs allocated to the job, or a maximum power consumption level, maximum power budget, minimum cost, minimum memory bandwidth, or minimum memory quantity or configuration for the job. Other example QoS levels may include best available, best fit, run on bare metal only, etc. The QoS level for a job may for example be automatically determined based on one or more of the following: (i) a performance characterization of the job, which may include data generated from a test run of the job, (ii) data from prior executions of the job, (iii) performance data from similar jobs, (iv) parameters specified by the user submitting the job, (iv) other job-related attributes such as application type (e.g. Linear Regression, Logistic Regression. Support Vector Machine (SVM), K-Nearest Neighbors (KNN), Random Forest), (v) which libraries or data sets are used by the job, or (vi) user or administrator input.

With the job QoS level is determined, a selected set of processors from the computing system are allocated and bound to the job. The set of processors are selected from the set of available processors in the system that meet the QoS level and the job requirements. The selection may be performed by solving the graph of configuration information in compliance with the QoS level and job requirements (e.g., using a simplex algorithm that minimizes cost). In some embodiments the set of processors may also be selected according to an affinity model or attribute (e.g., all-to-all, tile, closest, or scattered).

The computing system may comprise a number of nodes, in one or more clusters, both local and remote (e.g., cloud resources). The configuration information from the computing system may gathered from one or more system configuration files, or it may be empirically generated by running test jobs that are instrumented to measure values such as maximum/average bandwidth and latency. The gathered configuration information may be used to create a graph (e.g. mesh) representing interconnectivity information (e.g.

the bandwidth available between the different processors in the system, or latency between the processors and memory).

In some embodiments, the set of selected processors may be tested against a selected policy (e.g., no more than N percent of total system resources may be allocated to a job), and a policy violation notification may be generated if the policy is not met. Depending on the embodiment, the policy violation may block or stop execution of the job or it may simply generate a policy violation notification for the system administrator or user.

In some embodiments the method may be implemented in software as a management application that is stored on computer-readable storage medium (e.g., hard drives, solid state drives or "SSDs") and run on a management server/node in the computing system.

A system for scheduling computing jobs is also contemplated. The system may include a management node that is connected via one or more networks a group of non-uniformly interconnected computing resources (e.g., CPUs, GPUs, memory, storage). The management node may include a mapper that is configured to create a mesh topographical model (e.g., partially connected mesh) of the connectivity of the plurality of computing resources (e.g. including specified or measured bandwidths or bus widths between resources). For example, the mapper may be configured to run one or more test jobs to measure the available bandwidths between the computing resources and include those in the mesh model.

The management node may also include a scheduler that is configured to receive computing jobs and schedule them for execution. The jobs may include multiple processes, and the scheduler may allocate each to the processes to a selected subset of the computing resources, wherein the selected subset is selected based on the computing resource's availability, the topographical model, and one or more quality of service (QoS) levels. The scheduler may select the computing resources to be allocated by solving the mesh to select the subset of computing resources that meet the QoS requirements. For example, the QoS requirements include minimizing cost, power, or providing the best available interconnection performance (e.g., widest connection path). The scheduler may be configured to mask/unmask selected resources based on user or administrator input or other system-level information (e.g. avoiding nodes/processors that are unavailable, that are experiencing abnormally high temperatures or that are on network switches that are experiencing congestion).

In some embodiments, the scheduler may select of fractional portions of a computing resource (e.g., half of a GPU), and may oversubscribe resources (e.g., allocate 2 jobs to the same GPU at the same time) and permit two or more jobs to concurrently share a GPU. The scheduler may select resources based on performance feedback collected from the execution of earlier similar jobs to achieve best-fit across multiple jobs awaiting scheduling. In another example, the scheduler may select resources using a multi-dimensional best fit analysis based on one or more of the following: processor interconnect bandwidth, processor interconnect latency, processor-to-memory bandwidth and processor-to-memory latency. The scheduler may also be configured to select computing resources for a job according to a predefined placement affinity (e.g., all-to-all, tile, ring, closest, or scattered). For example, if a closest affinity is selected, the scheduler may select nodes that are closest to a particular resource (e.g., a certain non-volatile memory holding the data to be processed). In tile affinity, assigning jobs to processors in a single node (or leaf or branch in a hierarchical configuration) may be preferred when selecting resources.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Figure 1:
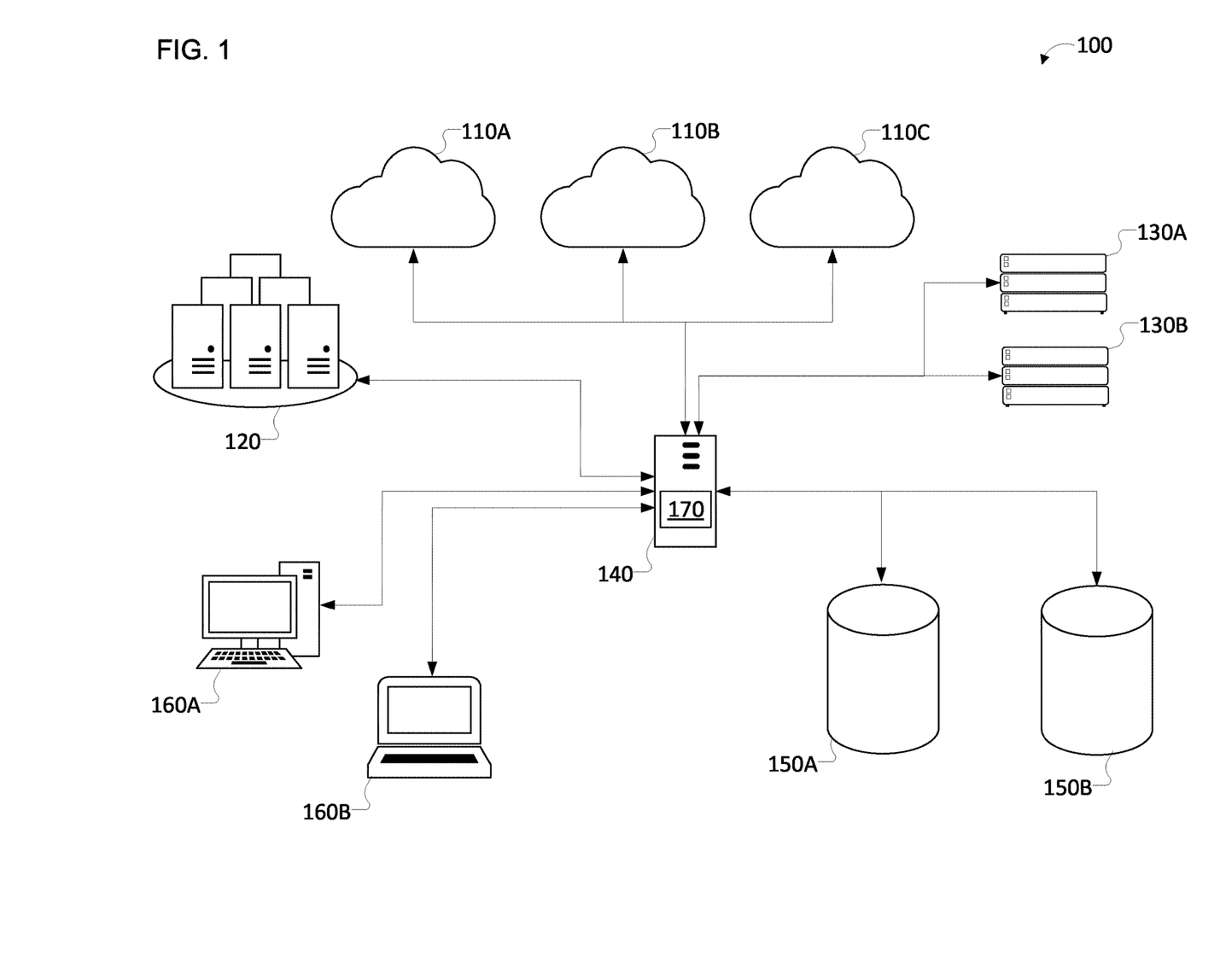
FIG. 1 is an illustration of one example of a system for intelligent scheduling of computing resources in a distributed computing system is shown.

Turning now to FIG. 1, an example of a distributed computing system 100 is shown. In this example, the distributed computing system 100 is managed by a management server 140, which may for example provide access to the distributed computing system 100 by providing a platform as a service (PAAS), infrastructure as a service (IAAS), or software as a service (SAAS) to users. Users may access these PAAS/IAAS/SAAS (platform as a service/infrastructure as a service/software as a service) services from their network-connected servers, PCs and laptop and mobile devices 160A and 160B via a web interface.

Management server 140 is connected to a number of different computing devices via local or wide area network connections. This may include, for example, cloud computing providers 110A, 110B, and 110C. These cloud computing providers may provide access to large numbers of computing devices (often virtualized) with different configurations. For example, systems with a one or more virtual CPUs may be offered in standard configurations with pre-determined amounts of accompanying memory and storage. In addition to cloud computing providers 110A, 110B, and 110C, management server 140 may also be configured to communicate with bare metal computing devices 130A and 130B (e.g., non-virtualized servers), as well as a data center 120 including for example one or more high performance computing (HPC) systems (e.g., each having multiple nodes organized into clusters, with each node having multiple processors and memory), and storage systems 150A and 150B. Bare metal computing devices 130A and 130B may for example include workstations or servers optimized for machine learning computations and may be configured with multiple CPUs and GPUs and large amounts of memory. Storage systems 150A and 150B may include storage that is local to management server 140 and well as remotely located storage accessible through a network such as the internet. Storage systems 150A and 150B may comprise storage servers and network-attached storage systems with non-volatile memory (e.g., flash storage), hard disks, and even tape storage.

Management server 140 is configured to run a distributed computing management application 170 that receives jobs and manages the allocation of resources from distributed computing system 100 to run them. In some embodiments, management server 140 may be a high-performance computing (HPC) system with many computing nodes, and management application 170 may execute on one or more of these nodes (e.g., master nodes) in the cluster.

Management application 170 is preferably implemented in software (e.g., instructions stored on a non-volatile storage medium such as a hard disk, flash drive, or DVD-ROM), but hardware implementations are possible. Software implementations of management application 170 may be written in one or more programming languages or combinations thereof, including low-level or high-level languages, with examples including Java, Ruby, JavaScript, Python, C, C++, C#, or Rust. The program code may execute on the management server 140, partly on management server 140 and partly on other computing devices in distributed computing system 100.

The management application 170 provides an interface to users (e.g., via a web application, portal, application programing interface ("API") server or CLI ("command line interface") that permits users and administrators to submit jobs via their workstations, laptop and mobile device 160A and 160B, and mobile devices, designate the data sources to be used by the jobs, and set one or more job requirements (e.g., parameters such as how many processors to use, how much memory to use, cost limits, job priorities, etc.). This may also include policy limitations set by the administrator for the distributed computing system 100.

Management server 140 may be a traditional PC or server, a specialized appliance, or one or more nodes within a cluster. Management server 140 may be configured with one or more processors, volatile memory and non-volatile memory such as flash storage or internal or external hard disk (e.g., network attached storage accessible to management server 140).

Management application 170 may also be configured to receive computing jobs from laptop and mobile devices 160A and 160B, determine which of the distributed computing system 100 computing resources are available to complete those jobs, select which available resources to allocate to each job, and then bind and dispatch the job to those allocated resources. In one embodiment, the jobs may be applications operating within containers (e.g. Kubernetes with Docker containers) or virtual machine (VM) instances.

Unlike prior systems, management application 170 may allocate resources based not just on the type of resource a job requires (e.g., number of CPUs, GPUs, amount of memory, amount of storage), but also based on other job requirements, system configuration (e.g., including the interconnectivity between those resources, resource power consumption), and quality of service (QoS) levels.

Figure 2:
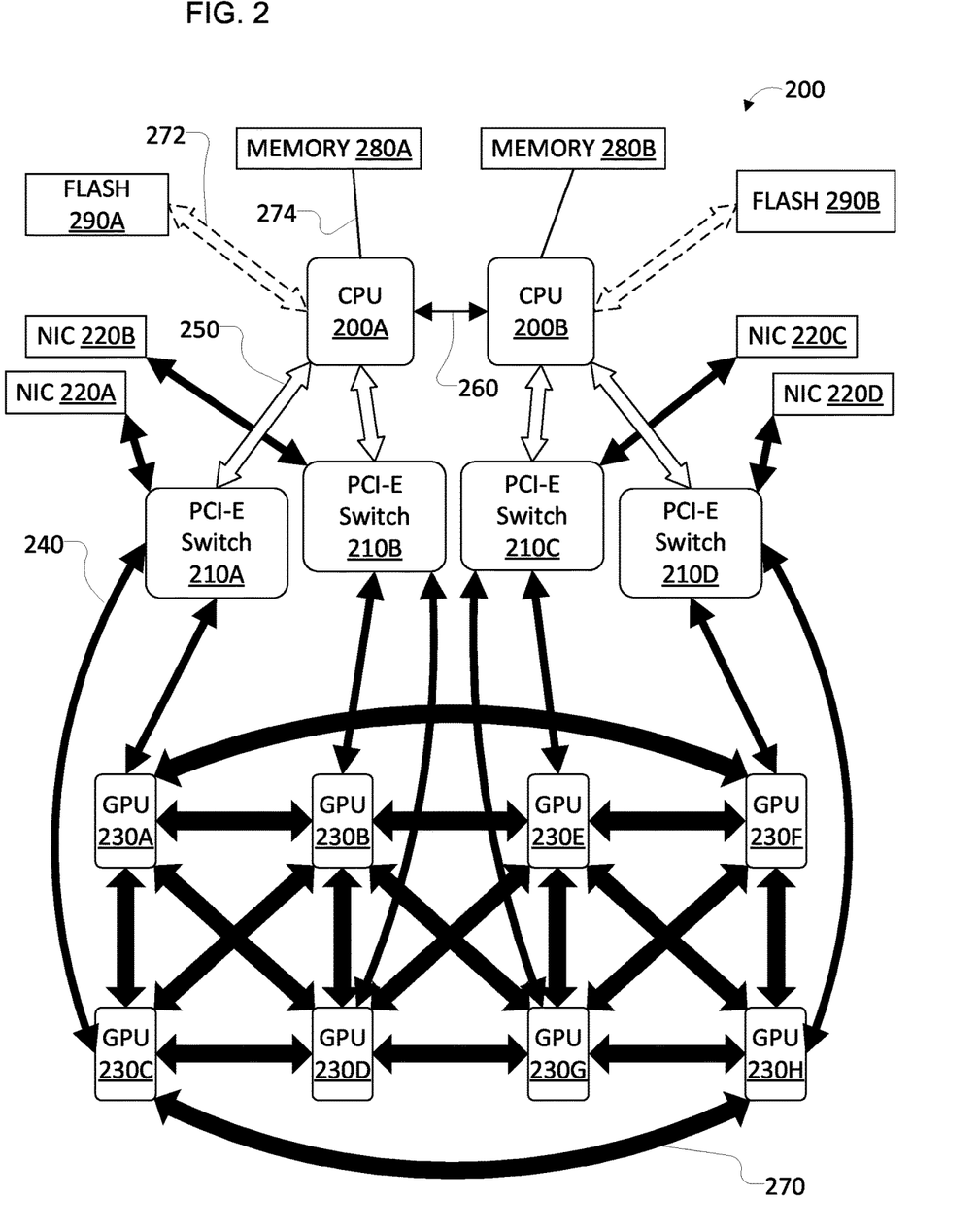
FIG. 2 is an illustration of one example of a computing device (e.g., a node in a computing system) with multiple GPUs.

Turning now to FIG. 2, one example embodiment of a node 200 that is part of an example high performance computing (HPC) system from data center 120 is shown. An HPC system may include large number of nodes such as node 200, and there may be different configurations within each node (e.g., different numbers of CPUs and GPUs, different amounts of memory, different topologies connecting the CPU, GPUs and memory, etc.). In this example, the node 200 includes many computing resources, including two CPUs 200A-B connected to eight GPUs 230A-H via PCI busses 240 and 250 and PCI-E switches 210A-D. GPUs 230A-H are interconnected via high speed interconnect 270 (e.g., SLI, NVLink/Switch, xGMI). While GPUs 230A-H are shown having the same interconnect between them, this is not always the case (as explained in greater detail below). Each CPU is connected to its own memory 280A-B via memory bus 274, as is each GPU (not shown). CPUs 200A-B may also be optionally connected to non-volatile memory such as flash storage 290A-B via bus 272 (e.g. PCI_E bus). CPUs 200A-B are connected to each other via a high-speed connection 260 (e.g. QPI or Infinity Fabric). Communications between GPUs 230A-H take place across high speed interconnect 270, while communications from one of GPUs 230A-H to a GPU on another node (not shown) would take much longer as it would have to go through one of PCI-E switches 210A-D and one of network interfaces 220A-D, traverse the network connection to the other node, and then go through the network interface and PCI-E switch on the other node to get to the GPU. Each of the different types of busses/connections 240-274 may have different data widths and frequencies, resulting in different bandwidths and latencies. Also, while the same bus type is shown connecting GPUs 230A-H, in many implementations different bus types may be used between different subsets of GPUs, even within a single node. Interconnection information about the types and performance of these buses (e.g., bandwidth, latency, width) and connections (including topological information) may be stored in configuration files (e.g., auto-generated by the computer system as part of a configuration process, or manually entered by the administrator based on hardware specifications), or and it may be automatically measured by running benchmarks or other test jobs on node 200 and across nodes in the cluster and distributed computing system 100. This interconnection information may be stored together with other system information in a graph (e.g., mesh), with the bandwidth information (and other system information) represented as a cost. Methods for graphs can then be used to solve for the lowest cost solution in the graph that optimizes the allocation of computing resources within the job requirements and one or more quality of service levels (e.g., minimum bandwidth between GPUs).

Figure 3:
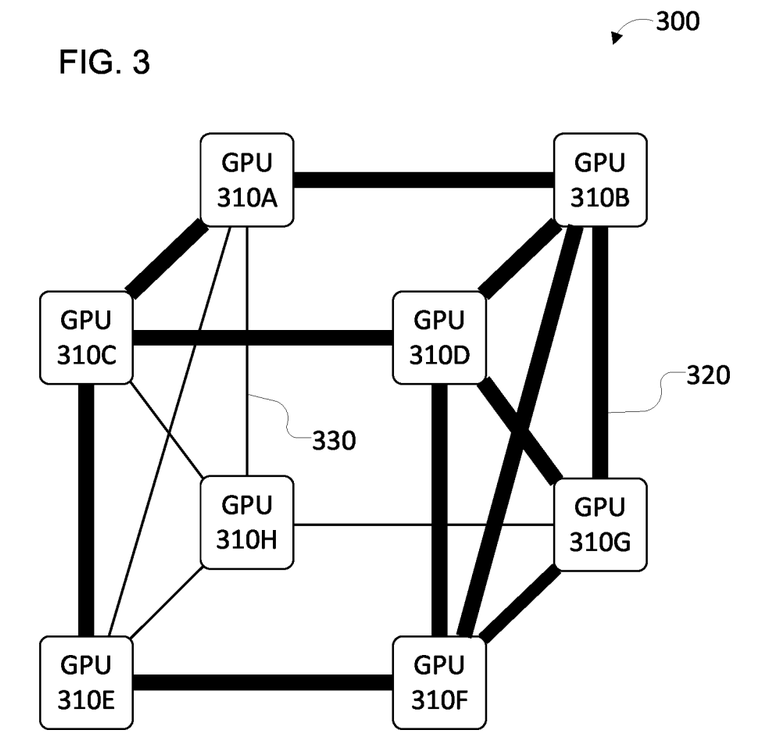
FIG. 3 is an illustration of an example mesh representation of configuration information for an example computing device with multiple GPUs.

Turning now to FIG. 3, an illustration of an example mesh representation of configuration information for an example computing device with multiple GPUs is shown. As noted above, in many computing systems, the interconnections between different computing resources may not be homogeneous. In this and subsequent examples, a thicker line indicates a higher-speed interconnect (e.g., NVLINK 2X), and a thinner line indicates a lower-speed interconnect (e.g. NVLINK 1X). In this example, GPUs 310A-H are connected (e.g., via point-to-point connections or via a switch) by connections with two different bandwidths, e.g., a lower bandwidth connection 330 represented by the thinner lines and a higher bandwidth connection 320 represented by the thicker lines. In this example, GPU 310H is only connected to GPUs 310A-F by lower bandwidth connections 330, while GPUs 310A-F are interconnected by higher bandwidth connections 320. These differences in interconnections can complicate the process of allocating computing resources in the computing system to different jobs. For example, a job requiring two processors and that has significant inter-GPU communication needs would perform well allocated to any two of GPUs 310A-F, as those GPUs have a higher bandwidth connection 320 between them. The same job would not perform as well if scheduled to any pair of GPUs including GPU 310H, as communications from GPU 310H would be limited by the lower bandwidth connection 330.

Figure 4:
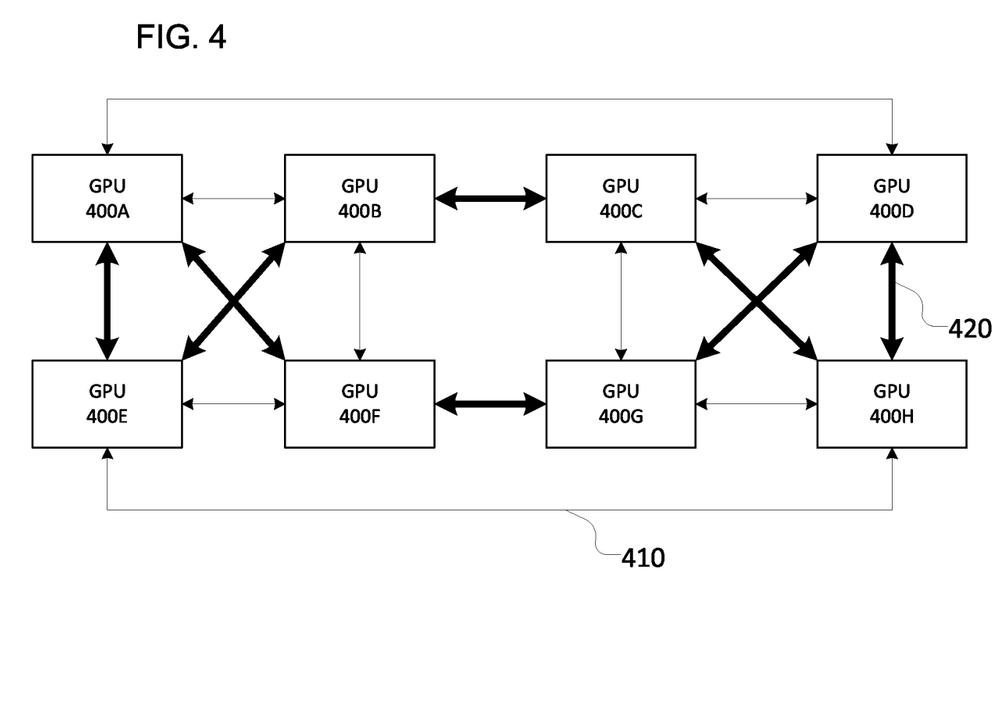
FIG. 4 is another illustration of a representation of configuration information for an example computing device with multiple GPUs.

Turning now to FIG. 4, an illustration of another example mesh representation of configuration information for another example computing device with multiple GPUs 400A-H is shown. In this example, each GPU 400A-H is the same type of processor (e.g., identical with respect to number of cores, cache size, performance, etc.), but their interconnectivity is not the same. For example, GPUs 400D and 400H are interconnected by a high-speed interconnect 420 (e.g., NVLink/Switch, xGMI), while GPUs 400H and 400E are connected via a lower speed interconnect 410 (e.g., PCIe, SLI, XDMA). As a result, data-intensive communications between GPUs 400D and 400H will likely be significantly faster than communication between GPUs 400H and 400E. Similarly, communications between any of GPUs 400A-H will be significantly faster (and lower latency) than communications between one of GPUs 400A-H and GPUs in another node (not shown), which would typically be performed over Ethernet or InfiniBand.

As noted above, management application 170 may perform resource allocation based on the interconnectivity between GPUs 400A-H and the job's attributes. For example, for a job requiting four GPUs and that generates significant volumes of all-to-all GPU-to-GPU communication, instead of just allocating any four GPUs to a particular job, management application 170 may evaluate the available GPUs in distributed computing system 100 and allocate a set of four GPUs that have the best all-to-all interconnectivity available (e.g., GPUs 400A-B, and 400E-F) under a QoS level specifying the best available performance. Conversely, if the job does not rely on GPU-to-GPU communication, or the job has QoS level indicating lowest priority or lowest cost, management application 170 may evaluate the available GPUs in distributed computing system 100 and allocate a set of four GPUs that have lower interconnectivity if that preserves the availability of the largest set of resources with the highest interconnectivity for potential future fastest available attribute jobs.

Figure 5:
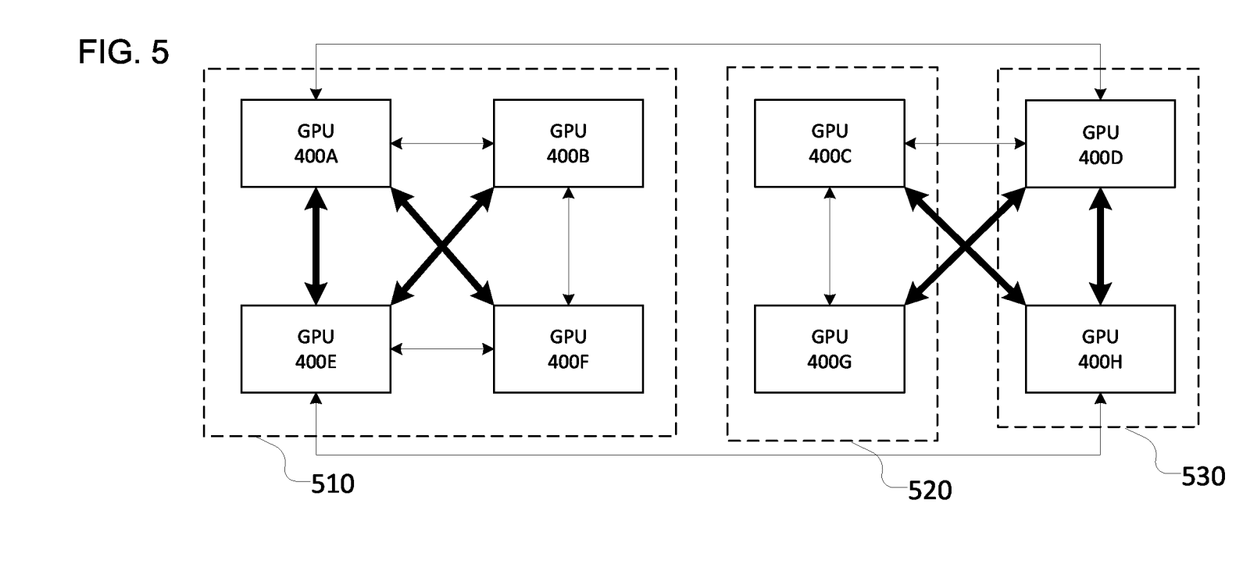
FIG. 5 is an illustration of an example allocation of the GPUs from FIG. 4.

Turning now to FIG. 5, another example of a mesh representation of configuration information for another example computing device with multiple GPUs 400A-H is shown. In this example, a sub-optimal allocation of resources has occurred, with a first job being allocated set 510 of GPUs 400A-B and 400E-F, a second job being allocated set 520 of GPUs 400C and 400G, and a third job being allocated set 530 of GPUs 400D and 400H (with sets 520 and 530 being suboptimal).

Figure 6:
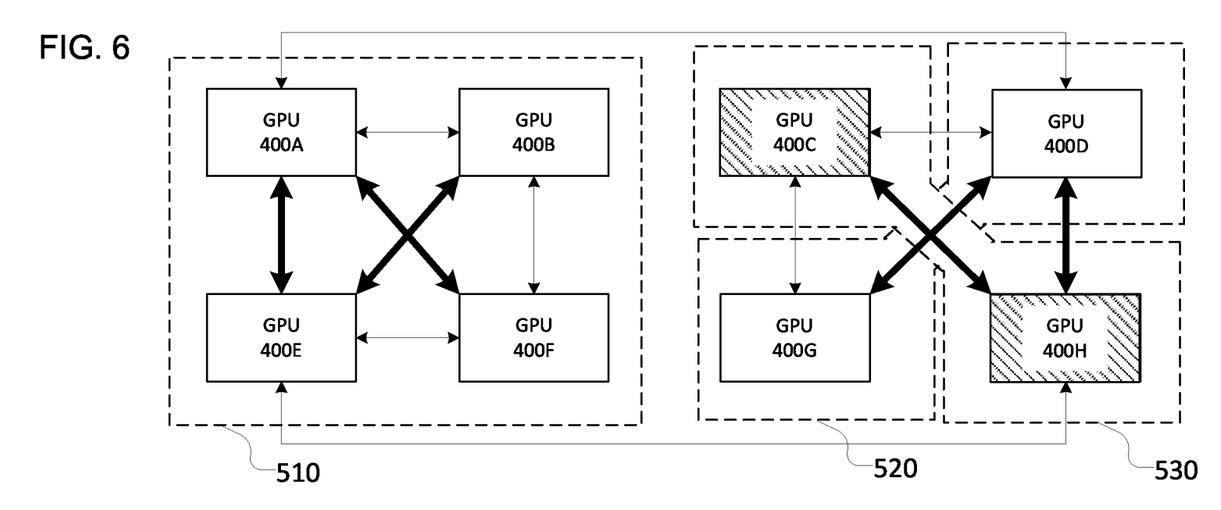
FIG. 6 is an illustration of another example allocation of the GPUs from FIG. 4.

Turning now to FIG. 6, the same set of GPUs 400A-H are shown with the same non-uniform interconnections, but this time with an optimal allocation with a best available QoS level applied to the jobs. This QoS level requires the best available interconnection bandwidth between GPUs allocated. In this example, the first job is once again allocated set 510 of GPUs 400A-B and 400E-F, but the second job is allocated set 520 of GPUs 400D and 400G, and the third job is allocated set 530 of GPUs 400C and 400H. This permits higher bandwidth between the GPUs for allocated to the second job and third job as compared with the earlier example.

Figure 7:
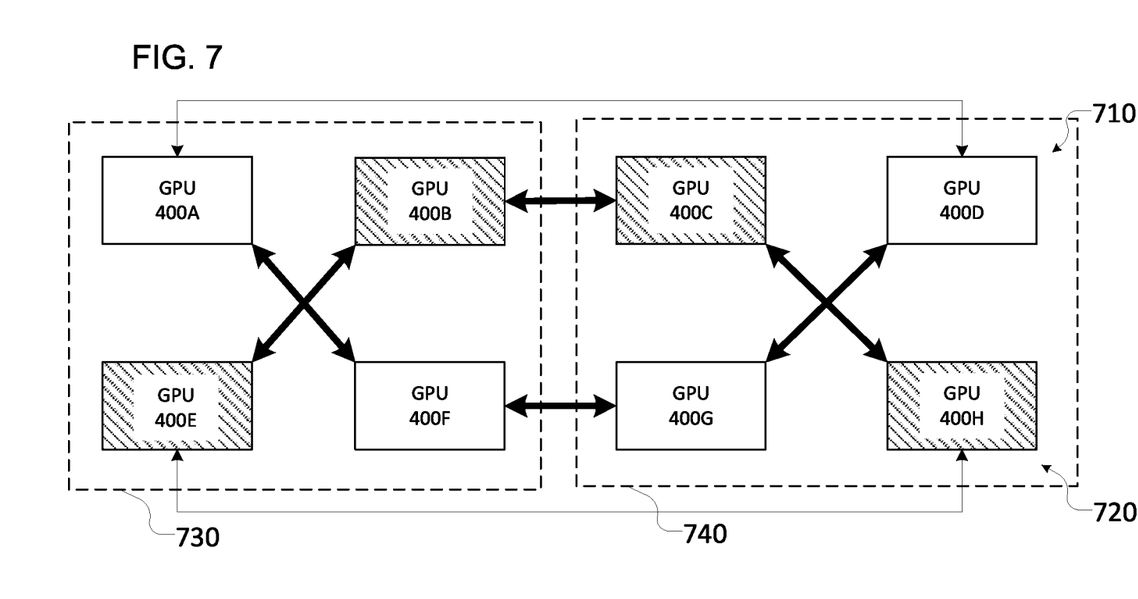
FIG. 7 is an illustration of yet another example allocation of the GPUs from FIG. 4.

Turning now to FIG. 7, another example of a mesh representation of configuration information for another example computing device with multiple GPUs 400A-H is shown. In this example, two jobs each requiring four GPUs each have been scheduled using a QoS level requiring a high bandwidth connection between GPUs allocated to a job, where each GPU has to communicate to its right and left GPU neighbors (1D topology), for this example an all-to-all GPU connectivity is not required. In this example the first job 710 is allocated GPUs 400A, 400D, and 400F-G, and the second job 720 is allocated GPUs 400E, 400B, 400C and 400H. This QoS level may be preferred over alternate allocations 730 and 740, in which each GPU is only able to communicate with one other GPU via a highspeed interconnect.

Figure 8:
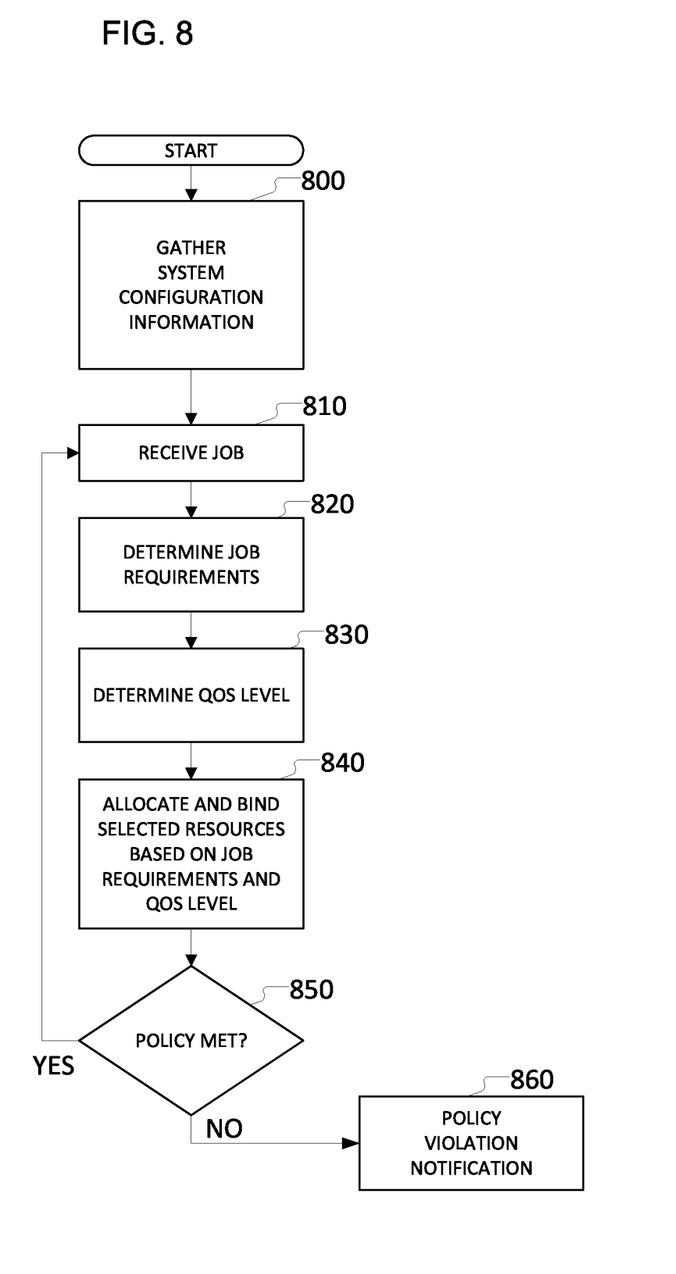
FIG. 8 is a flowchart of an example embodiment of a method for allocating computing resources in a computing system according to the teachings of the present disclosure.

Turning now to FIG. 8, a flowchart of an example embodiment of a method for allocating computing devices in a computing system is shown. Configuration information about the distributed computing system is gathered (step 800). This may include reading system configuration files to determine the quantity and location of available computing resources in the distributed computing system (e.g., type and number of processes, interconnect types, memory quantity and location, and storage locations). This may also include running test jobs (e.g., micro-benchmarks) that are timed to measure the interconnectivity of the computing resources. While the earlier examples above illustrated GPU and CPU interconnectivity, interconnectivity to other types of resources (e.g., memory and storage bandwidth and latency) can also be used in selecting which computing resources are allocated to jobs. As resources are allocated and come online and go offline for various reasons (e.g., maintenance), this system configuration information may be updated.

The configuration information may be gathered from one or more system configuration files, or it may be empirically generated by running test jobs that are instrumented to measure values such as maximum/average bandwidth and latency. The gathered configuration information may be used to create a graph (e.g., mesh) representing interconnectivity information (e.g., the bandwidth available between the different processors in the system, or latency between the processors and memory).

Jobs to be executed in the computing system are received (step 810), and requirements for those jobs are determined (step 820), e.g., the number of processors or amount of memory required. The jobs may include applications run in batch mode (i.e., without user interaction) or interactive mode, and some may be within containers or virtual machines. One or more quality of service (QoS) levels are also determined (step 830) and applied to the jobs. For example, one QoS level may be a minimum bandwidth required between GPUs allocated to the job, or a maximum power consumption for the job. Other example QoS levels may include best available, best fit (e.g., determined by feedback from the performance characterization), run on bare metal only, etc. The QoS level for a job may for example be automatically determined based on one or more of the following: (i) a performance characterization of the job, which may include data generated from a test run of the job, (ii) data from prior executions of the job, (iii) performance data from similar jobs, (iv) parameters specified by the user submitting the job, (iv) other job-related attributes such as application type (e.g. Linear Regression, Logistic Regression. Support Vector Machine (SVM), K-Nearest Neighbors (KNN), Random Forest), (v) which libraries or data sets are used by the job, or (vi) user or administrator input.

As part of determining the QoS level, the job may be profiled to determine what impact different selections of computing resources may have on the job. This may be performed for example by comparing the job with a database of earlier reference jobs that have been already characterized for interconnectivity impact (e.g., based on the type of application or libraries the job uses). For some jobs where there is little cross-resource communication, resource interconnectivity may not have a significant performance impact. These jobs may then be assigned a least cost QoS level as they may be scheduled without concern regarding resource interconnectivity. Job metadata may also be used to determine QoS level. For example, a user or administrator may designate a job as "fastest available" or subject to a specified limit for power consumption when they submit a job though the management application's user interface.

With the job QoS level determined, a selected set of processors from the computing system are allocated and bound to the job (step 840). The set of processors are selected from the set of available processors in the system that meet the QoS level and the job requirements. The selection may be performed by solving the graph of configuration information in compliance with the QoS level and job requirements (e.g., using a simplex algorithm that minimizes cost). In some embodiments the set of processors may also be selected according to an affinity model or attribute (e.g., all-to-all, ring, tile, closest, or scattered).

In some embodiments, if the job has no interconnection preference, e.g., it is of a type that is not impacted by resource interconnectivity, or if has a "lowest cost" QoS level, the management application may select and allocate the set of the available computing resources with the least connectivity that maximizes the interconnectivity of the remaining available computing resources. Other example QoS levels include best fit, best available, any, next (n-th) best. In one embodiment, best fit is determined by feedback from performance characterization of the job.

In some embodiments, the set of selected resources may be tested against a selected policy (step 850). For example, a policy may specify no more than a certain percentage of total system resources may be allocated to a single job. A policy violation notification may be generated (step 860) if the policy is not met. Depending on the embodiment, the policy violation may block or stop execution of the job, or it may simply generate a policy violation notification for the system administrator or user.

In some embodiments the method may be implemented in software as a management application 170 that is stored on computer-readable storage medium (e.g., hard drive, SSD) and run on a management server/node in the computing system. The management application may for example include a mapper component that automatically collects the system configuration information and interconnection information and creates a graph from it, and a scheduler component that determines the applicable job requirements, QoS levels, and solves the graph to determine the optimal set of system resources to allocate and bind to each job received. The scheduler may also check for compliance with any applicable policies. A group resource selector algorithm (e.g., using Russian doll search, bucket elimination, branch and bound) may be used to satisfy multiple QoS levels (e.g., using the graph of known system resources, topology, resource capabilities, and performance characterization) when selecting the computing resources to be allocated.

In some embodiments, the jobs may be composed of threads, tasks, processes or code blocks that may be scheduled individually for finer granularity. Similarly, in some embodiments the computing resources allocated may be more granular as well, e.g., by assigning cores or threads within CPUs/GPUs instead of whole CPUs/GPUs, or assigning portions of GPUs or other accelerators (e.g., field programmable gate arrays or "FPGAs"), portions of memory, portions of caches.

The scheduler may also be configured to perform performance-aware scheduling/placement of jobs onto selected sets of computing resources based on performance characterization of the job. The scheduler may also be configured to select computing resources for a job according to a predefined placement affinity (e.g., all-to-all, tile, closest to a resource, or scattered). For example, if a scatter affinity is selected, the schedule may be configured to select a single GPU in each of eight different nodes to distribute the job. If a closest affinity is selected, the scheduler may select nodes that are closest to a particular resource (e.g., a certain non-volatile memory holding the data to be processed). In tile affinity, assigning jobs to processors in a single node (or leaf or branch in a hierarchical configuration) may be preferred when selecting resources.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such elements. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." and "for example" in the specification is to be construed broadly and is used to provide non-limiting examples of embodiments of the disclosure, and the disclosure is not limited to such examples. Uses of "and" and "or" are to be construed broadly (e.g., to be treated as "and/or"). For example, and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a computer, a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A method for allocating computing resources in a computing system, the method comprising:

gathering configuration information for a plurality of processors, wherein the configuration information comprises at least one of i) a plurality of bandwidth attributes representing bandwidths between processors of the plurality of processors, wherein at least two bandwidth attributes of the plurality of bandwidth attributes are different and ii) a plurality of latency attributes representing latencies between the processors of the plurality of processors, wherein at least two latency attributes of the plurality of latency attributes are different;

receiving at least a first job and a second job to be executed in the computing system;

determining requirements for the first and second jobs;

allocating and binding the first job to a first subset of processors from the plurality of processors based on the configuration information; and allocating and binding the second job to at least a second subset of processors from the plurality of processors based on the configuration information.

2. The method of claim 1, wherein the configuration information comprises both of the plurality of bandwidth attributes and the plurality of latency attributes.

3. The method of claim 1, further comprising determining a quality of service (QoS) level for at least one of the first job and the second job.

4. The method of claim 3, wherein allocating and binding the first job to the first subset of processors is further based on the QoS level.

5. The method of claim 4, wherein the QoS level comprises a minimum bandwidth required between the first subset of processors allocated to the first job.

6. The method of claim 4, wherein the QoS level for the first job is based on a performance characterization of the first job, wherein the performance characterization is based on performance data collected from prior executions of the first job.

7. The method of claim 3, wherein the QoS level comprises a predetermined minimum memory configuration, wherein the predetermined minimum memory configuration comprises a minimum memory quantity and a minimum memory bandwidth.

8. The method of claim 3, wherein the QoS level comprises at least one of a maximum power consumption level, a maximum power budget, and a minimum cost.

9. The method of claim 3, wherein at least some of the plurality of processors comprise graphical processing units (GPUs), and wherein the QoS level is a minimum bandwidth between the GPUs.

10. The method of claim 1, wherein allocating and binding the first job to the first subset of processors is further based on an affinity model selected from the group comprising all-to-all, tile, closest, or scattered.

11. The method of claim 1, further comprising testing at least one of the first subset of processors and the second subset of processors against a selected policy, and generating a policy violation notification if the policy is not met.

12. The method of claim 11, wherein the selected policy indicates that no more than a certain percentage of total system resources is allocated to a single job.

13. A method for scheduling jobs on a computing system comprising a plurality of processors, the method comprising:

determining bandwidths between each interconnected processor in the plurality of processors such that a plurality of bandwidths is determined, wherein at least two bandwidths of the plurality of bandwidths are different;

determining latencies between each interconnected processor in the plurality of processors such that a plurality of latencies is determined, wherein at least two latencies of the plurality of latencies are different;

receiving a first job to be processed;

receiving a second job to be processed;

determining one or more job requirements for each of the first job and the second job;

selecting a first subset of the plurality of processors based on the one or more job requirements and at least one of the plurality of bandwidths and the plurality of latencies; and allocating and binding the first subset of the plurality of processors to the first job.

14. The method of claim 13, further comprising determining a first quality of service (QoS) level for the first job, wherein selecting the first subset of the plurality of processors is further based on the first QoS level.

15. The method of claim 14, wherein the first QoS level for the first job is based on a performance characterization of the first job, wherein the performance characterization is based on performance data collected from prior executions of the first job.

16. The method of claim 13, further comprising creating a mesh representing the plurality of bandwidths available between the plurality of processors.

17. A non-transitory computer-readable storage medium storing instructions of a software program, the software program being executable by one or more nodes of a computing system to provide operations comprising:

gathering configuration information for a plurality of processors, wherein the configuration information comprises at least one of i) a plurality of bandwidth attributes representing bandwidths between processors of the plurality of processors, wherein at least two bandwidth attributes of the plurality of bandwidth attributes are different and ii) a plurality of latency attributes representing latencies between the processors of the plurality of processors, wherein at least two latency attributes of the plurality of latency attributes are different;

receiving at least a first job and a second job to be executed in the computing system;

determining requirements for at least the first and second jobs;

allocating and binding the first job to a first subset of processors from the plurality of processors based on the configuration information; and allocating and binding the second job to at least a second subset of processors from the plurality of processors based on the configuration information.

18. The non-transitory computer-readable storage medium of claim 17, further comprising determining a quality of service (QoS) level for at least one of the first job and the second job.

19. The non-transitory computer-readable storage medium of claim 18, wherein allocating and binding the first job to the first subset of processors is further based on the QoS level.

20. The non-transitory computer-readable storage medium of claim 17, wherein gathering the configuration information comprises executing one or more test jobs to measure the plurality of bandwidth attributes between each interconnected processor.

21. A system, comprising:

a non-transitory computer-readable storage medium;

one or more nodes configured to execute instructions of a software program stored in the non-transitory computer-readable storage medium, which when executed cause the one or more nodes to:

gather configuration information for a plurality of processors, wherein the configuration information comprises at least one of i) a plurality of bandwidth attributes representing bandwidths between processors of the plurality of processors, wherein at least two bandwidth attributes of the plurality of bandwidth attributes are different and ii) a plurality of latency attributes representing latencies between the processors of the plurality of processors, wherein at least two latency attributes of the plurality of latency attributes are different;

receive at least a first job and a second job to be executed;

determine requirements for at least the first job and the second job;

allocate and bind the first job to a first subset of processors from the plurality of processors based on the configuration information; and allocate and bind the second job to at least a second subset of processors from the plurality of processors based on the configuration information.

* * * * *